April 4, 1950 G. W. JOHNSON 2,502,728
EGG WASHING MACHINE
Filed Feb. 10, 1944 4 Sheets-Sheet 1
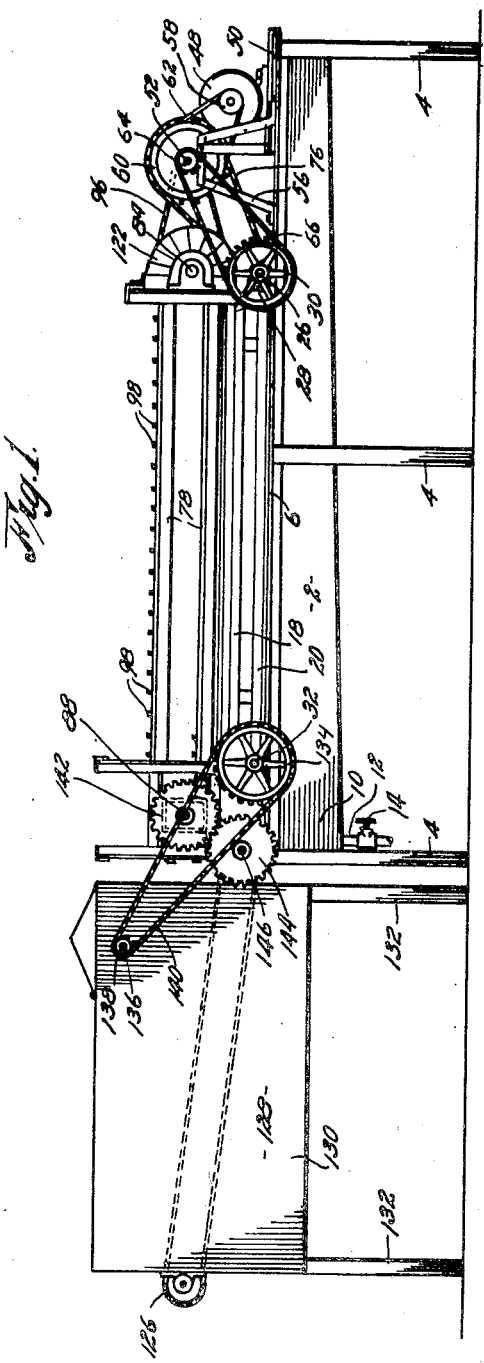
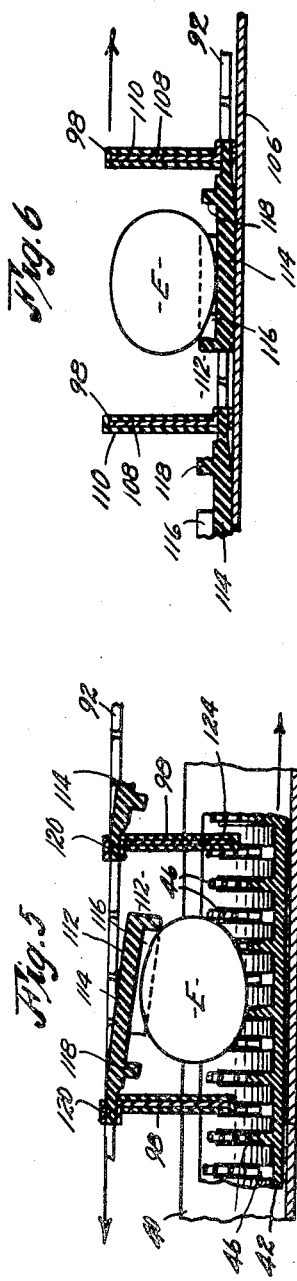
INVENTOR,
Gordon W. Johnson.
BY Roy E. Hamilton
Attorney.

April 4, 1950     G. W. JOHNSON     2,502,728
EGG WASHING MACHINE
Filed Feb. 10, 1944     4 Sheets-Sheet 2
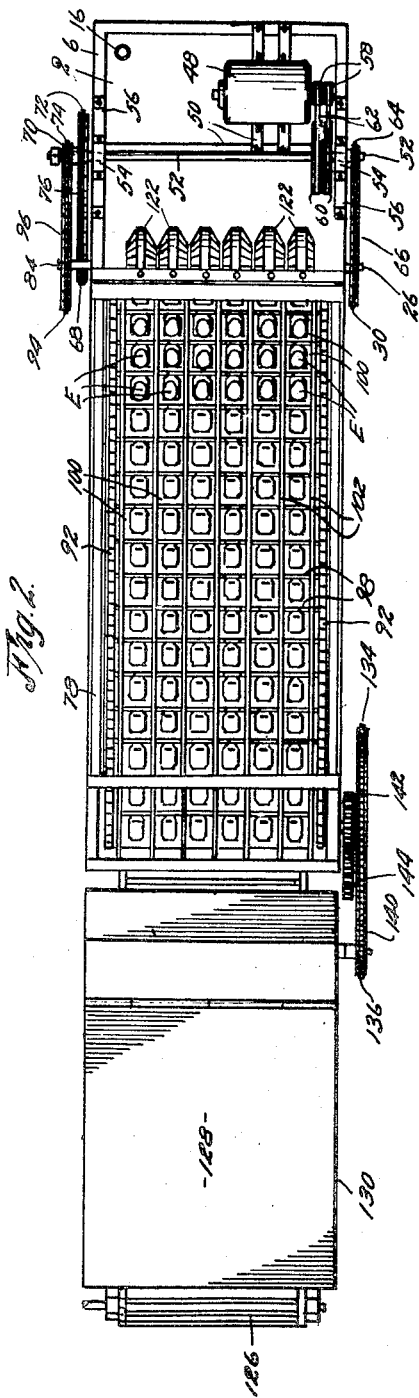
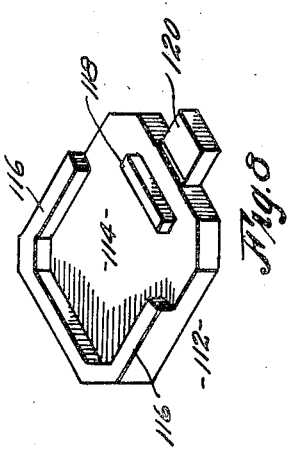
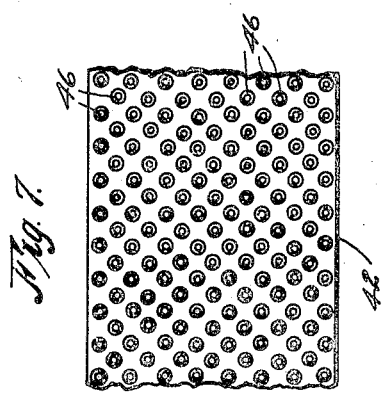
INVENTOR,
Gordon W. Johnson.
BY Roy E. Hamilton,
Attorney.

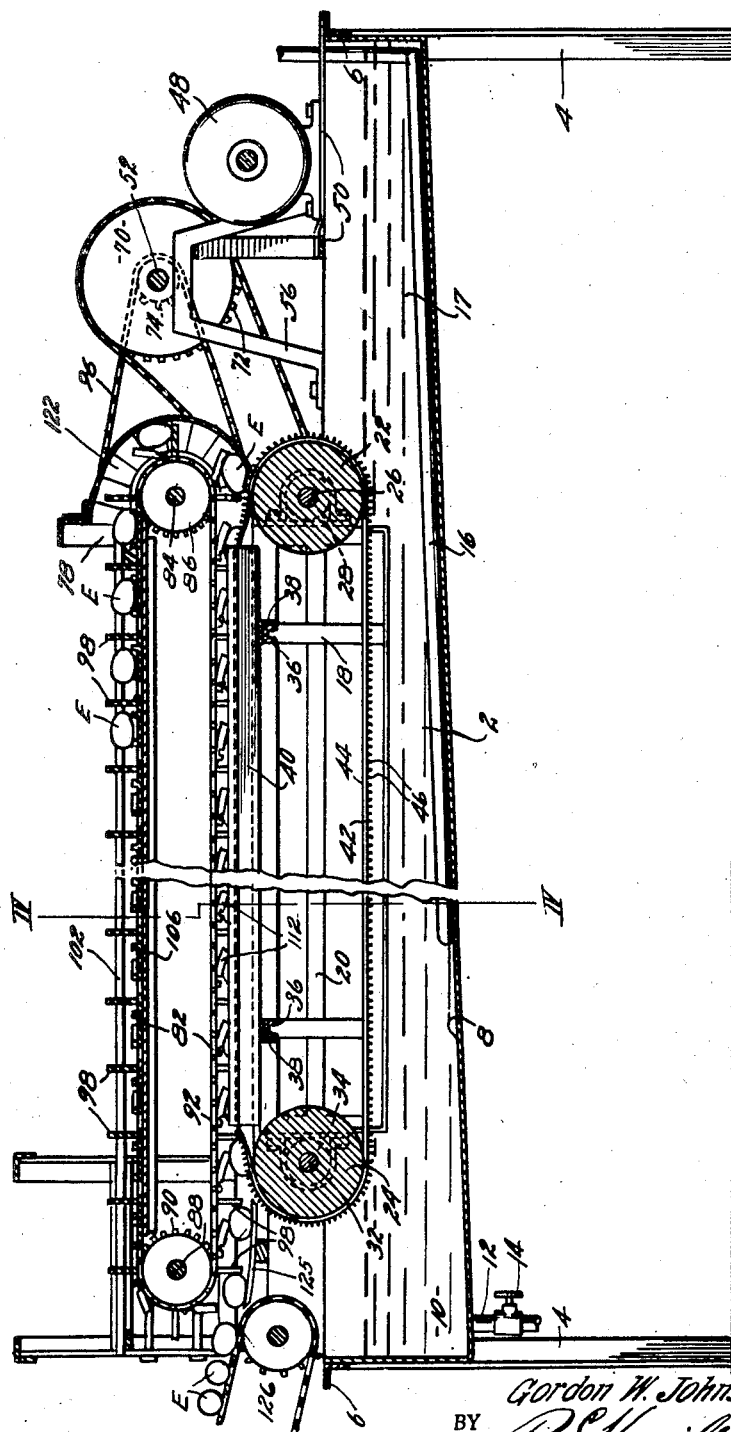

April 4, 1950  G. W. JOHNSON  2,502,728
EGG WASHING MACHINE
Filed Feb. 10, 1944  4 Sheets-Sheet 4
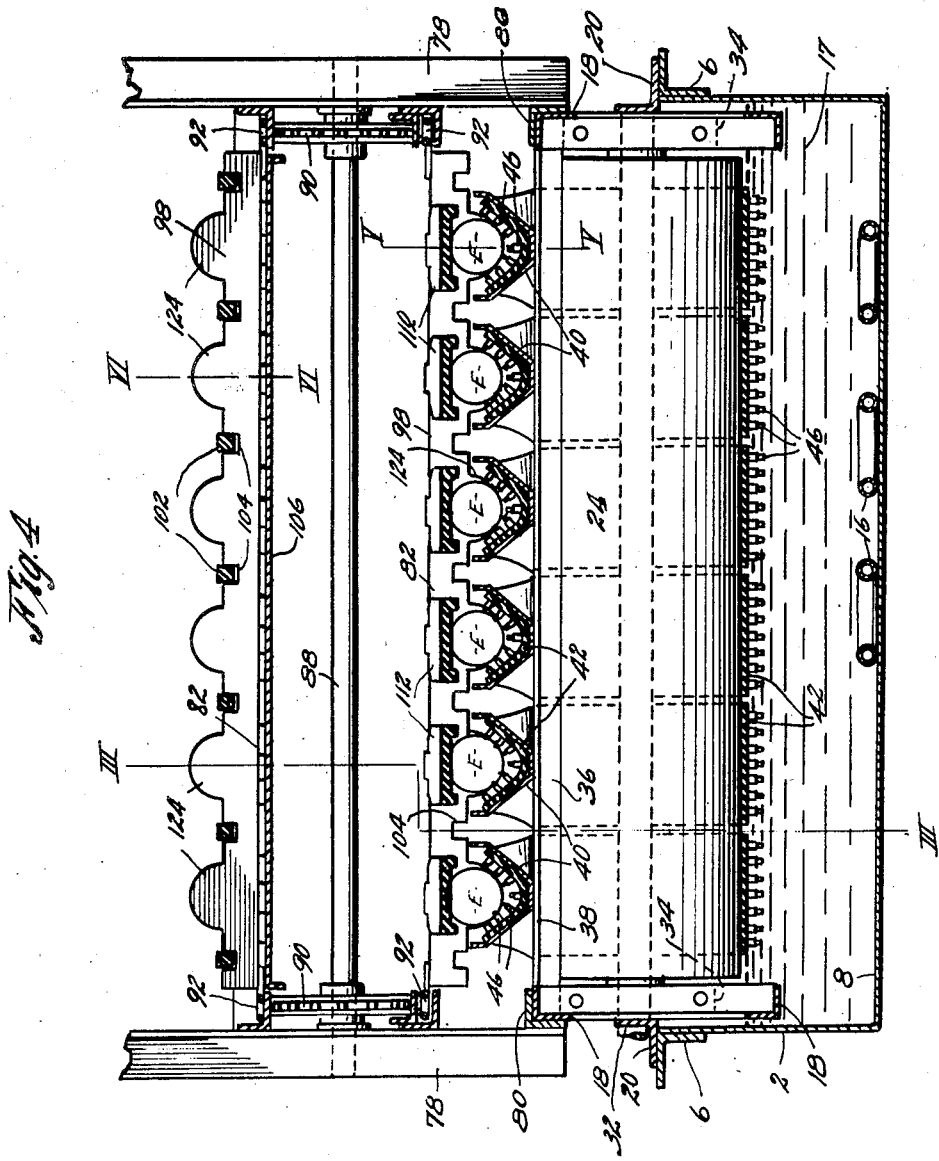
INVENTOR,
Gordon W. Johnson.
BY Roy E. Hamilton
Attorney.

Patented Apr. 4, 1950

2,502,728

UNITED STATES PATENT OFFICE 2,502,728

EGG WASHING MACHINE

Gordon W. Johnson, Overland Park, Kans., assignor to Gordon Johnson Company, Kansas City, Mo., a corporation of Missouri Application February 10, 1944, Serial No. 522,186

16 Claims. (Cl. 15—3.15)

This invention relates to improvements in washing machines and has particular reference to a washing machine suitable for washing eggs or similar articles.

Much trouble has been experienced in the process of washing eggs, due to the fact that they are very fragile and because of their shape and because of the relative large range of sizes.

The principal object of the present invention is the provision of an egg washing machine wherein the eggs are always maintained in segregated relation during the washing operation, thereby precluding direct contact of the eggs which would eliminate to a large degree the egg breakage.

Another object of this invention is the provision of an egg washer wherein the eggs are washed above the liquid level of the washing fluid.

A further object is the provision of an endless egg scrubbing belt that is adapted to be transversely curved to form a trough for the reception of eggs being washed.

A still further object of the invention is the provision of an egg washer having relatively slow traveling egg conveyor to move the eggs over a rapidly moving scrubber member.

Another object is the provision of a combined egg washer and drier.

Other objects are simplicity and economy of construction, speed and efficiency of operation and adaptability for use in simultaneously washing eggs varying in size from the largest to the smallest.

With these objects in view, as well as other objects which will appear during the course of the specification, reference will now be had to the drawings, wherein:

Figure 1 is a side elevational view of an egg washing machine embodying this invention.

Fig. 2 is a plan view of the washing machine shown in Fig. 1.

Fig. 3 is a reduced, fore-shortened sectional view taken on line III—III of Fig. 4.

Fig. 4 is an enlarged cross sectional view taken on line IV—IV of Fig. 3.

Fig. 5 is an enlarged fragmentary sectional view taken on line V—V of Fig. 4.

Fig. 6 is an enlarged sectional view taken on line VI—VI of Fig. 4.

Fig. 7 is a plan view of a section of the scrubber belt.

Fig. 8 is a perspective view of one of the egg receiving tabs.

Throughout the several views like reference characters refer to similar parts and the numeral 2 designates a relatively shallow, elongated tank supported on legs 4 and having a substantially horizontally disposed angle-iron top rail 6. The bottom 8 of this tank is slightly inclined to present a deeper end portion 10 of the tank, having a drain pipe 12 provided with control valve 14 by means of which the tank may be drained.

A heating unit 16 of any suitable type, such as steam pipes, is located within the tank and is so positioned as to be immersed in the washing liquid 17 contained within the tank. Any of the various well known means for regulating the temperature of the washing liquid might be used without departing from the invention.

A frame 18, preferably made of angle iron welded together is provided with side rails 20 which are adapted to rest on the tank rails 6 with a portion of the frame disposed above, and a part below the top of the tank. Mounted transversely of frame 18 at each of its opposite ends is a belt drum 22 and 24 respectively. Drum 22 is provided with a shaft 26 which is mounted for rotation in bearings 28 carried by frame 18. One end portion of shaft 26 extends beyond the side of frame 18, and is provided with a sprocket wheel 30. The belt drum 24 is rigidly mounted on shaft 32 which in turn is mounted in bearings 34 affixed to frame 18.

Frame 18 is provided with cross members 36 spaced adjacent each end of the frame and adapted to receive angled support member 38 which serves as a base for a series of spaced apart troughs 40 which are positioned with their inside bottom surface in substantial register with a line tangent to the upper edge of the drums 22 and 24. Endless scrubber belts 42 are operatively positioned about drums 22 and 24, one belt passing through each of the troughs 40, as clearly shown in Fig. 4. Belts 42 are made of a soft, pliable material, such as rubber, which will not cause an objectionable amount of egg breakage, and will readily adapt itself to the various shapes and conditions necessary to obtain proper handling of eggs during the washing operation. Belt 42 has a relatively smooth inner surface 44 suitable for engaging the belt drums for driving purposes. The outer face of the belt is provided with a large number of spaced apart papilla 46 or fingers suitable for forming an egg scrubbing surface which will adjust itself to the various sizes and shapes of eggs. As shown, the papilla are in staggered rows both longitudinally and transversely of the belt; however, the position of the papilla may be varied both in size, shape and relative position to suit the particular type of washing operation being done.

It is to be understood that this washer is suitable for washing other products or articles besides eggs.

The power unit is supported on the shallow end portion of tank 2 and comprises a motor 48 adjustably mounted on a supporting frame 50 secured to the tank rail 6 as best shown in Figs. 1 and 2. A transversely disposed shaft 52 is rotatably mounted in bearing 54 mounted on standards 56 carried by the tank 2.

Pulleys 58 mounted on the motor shaft are operatively connected with pulleys 60, fixed to shaft 52 by belts 62. Secured to the outer end portion of shaft 52 is a sprocket pinion 64 which is interconnected by chain 66 with the relatively large sprocket wheel 30, secured to shaft 26 whereby the shaft is rotated by motor 48. The other end of shaft 26 is provided with a small sprocket wheel 68 which is secured for rotation therewith to drive a double sprocket wheel 70 rotatably mounted on shaft 52. The double sprocket wheel comprises a large sprocket wheel 72, and a small sprocket 74 formed on the hub of sprocket wheel 72 to rotate therewith. A sprocket chain 76 operatively connects sprocket wheel 68 with sprocket wheel 72.

It will be observed that the scrubber belts are driven by the motor at a relatively rapid rate of speed, and that the lower reach of these belts contact the upper surface of the washing liquid 17, as clearly shown in Fig. 4, thereby picking up a sufficient amount of the liquid and carrying it to the upper reaches of the belts whereby a sufficient amount of the washing liquid is provided to properly wash the eggs deposited in the cupped portions of the belts as hereinafter described.

The means for conveying the eggs to and from the scrubber belts comprises a frame 78 having internal ledges 80 suitable for resting on top of frame 18, as shown in Fig. 4, and provided with an endless conveyor belt 82 mounted thereon for relatively slow orbital movement directly above the upper reaches of the scrubber belts 42, and in parallel relation therewith. Rotatably mounted in one end of frame 78, in parallel relation with shaft 26, is a shaft 84 carrying fixed sprocket wheels 86. At the other end of said frame is a rotatably mounted shaft 88 carrying sprocket wheels 90. Sprocket chains 92 interconnect corresponding sprocket wheels 86 and 90, and serve as a flexible frame work for the conveyor belt 82. The outer extremity of shaft 84 is provided with a relatively large fixed sprocket wheel 94 which is operatively interconnected with sprocket 74 by means of sprocket chain 96. It will be noted that the train of sprocket wheel from the motor 48 to the conveyor drive shaft 84 is such that the speed of travel of the conveyor belt will be much slower than the speed of travel of the scrubber, furthermore, the lower reach of the conveyor belt and the upper reach of the scrubber belts, which operate together to scrub the eggs, travel in opposite directions.

Extending in spaced apart relation between chains 92 are cross bars 98 which are securely attached to the chains to form opposite side walls of an egg compartment 100. A series of spaced apart dividing strips 102, secured at their opposite ends to frame 78 are so spaced as to form the other two sides of the egg compartments 100 as the cross bars move longitudinally relatively thereto. Since the bars 98 are relatively wide, it is found convenient to notch the bars at 104, so as to lower the strips 102 to prevent the smaller eggs from passing there beneath. A stationary planar table 106 is positioned between the reaches of the conveyor belt and adjacent the under side of the top reach to support the eggs that are delivered to the conveyor belt.

Cross bars 98 are preferably made of sheet metal plates 108 coated with rubber 110, as best shown in Figs. 5 and 6. Each of the cross bars is provided with a series of tabs 112, which trail the bars and rest on the table 106 as they move along the upper reach of their orbital travel. When the conveyor travels over the sprocket wheels 86 and reverses its direction, the tabs 112 will rest on top of the egg as the egg passes along the trough like portion of the scrubber belt 42, thus precluding objectionable bouncing of the egg and assisting in the egg washing operation. These tabs 112 are secured to the cross bars 98 or may be formed integral therewith. These tabs best shown in Figs. 5, 6 and 8 are made of a cushion material such as rubber, and serve to receive the eggs from above to prevent breaking (see Fig. 6).

Referring to Fig. 2, it will be noted that the eggs E are positioned in the separate egg compartments 100, either manually or by automatic equipment, and when so deposited, take the position indicated in the enlarged fragmentary sectional view, Fig. 6. This tab as shown, has a body portion 114, side walls 116, front ledge 118, and an attached tongue 120. The side walls and front ledge serve to maintain the egg in position on the tab and to hold it away from the divided strips 102.

For properly guiding the eggs as they move about the sprocket wheels 86, an arcuate trough like member 122 is provided for each row of eggs. This trough is secured to the frame 78 whereby it is stationary therewith. At one position of the egg, it will be in substantially a vertical position of travel, and will rest against the enlarged arcuate portion 124 of cross bar 98. Furthermore, when the egg is positioned in the trough like portion of the upper reach of the scrubber belt 42, this projecting portion 124 will reach into the trough to force the egg along its direction of travel while resting on the scrubber belt which is moving in the opposite direction.

Due to the differential in speed of shafts 26 and 84 as previously described, the speed of travel of the scrubber belt 42 will be much greater than the speed of travel of a conveyor belt, thus maintaining the eggs in scrubbing position for a sufficiently long period of time to insure a thorough cleaning. By simply substituting reduction sprockets for those shown, any desired differential of speed may be obtained for drive shafts 26 and 84.

Referring to Fig. 3, it will be noted that the conveyor belt over-hangs the end of the scrubber belt, thus making it possible to move the washed eggs across the stationary member 125, and on to a conveyor 126.

This conveyor 126 is a part of a drier 128, which is adapted to be used in conjunction with the washer for drying the eggs and delivering them ready for packing. This drier comprises a body member 130, mounted on legs 132. Since it is desirable to operate the drier from the motor 48, the following mechanism is provided to inter-connect the drier operating parts with moving parts of the washer. A sprocket wheel 134 secured to shaft 32 is operatively connected with sprocket wheel 136 mounted on fan shaft 138 by means of chain 140. A spur gear 142 is rigidly mounted on shaft 88 to operatively engage spur gear 144 which in turn is mounted on the drier conveyor drive shaft 146. This driving means is such that the fan shaft 138 will be driven at high speed while the conveyor 126 will be driven at a slow rate of speed. As the washed eggs are slowly moved through the drier, they will be subjected to the drying effect of hot air produced by any of the well known means.

In the operation of this egg washing machine, motor 48 is energized to drive the scrubber belt 42 and conveyor belt 82 in like directions so that the lower reach of the conveyor belt adjacent the upper reach of the scrubber belt, will move in opposite directions. The speed of the scrubber belt is preferably relatively greater than the speed of the conveyor belt. The operator now places the eggs E in segregated relation in the pockets formed by the stationary longitudinal members 102 and the transverse conveyor driving members 98. The eggs rest on the tabs 112 carried by the transverse members 98 which rest on the stationary table 106. The eggs are carried around shaft 84 as clearly shown in Fig. 3, and are delivered to the corresponding scrubber belt which is cupped, as clearly shown in Fig. 4. This scrubber belt is so positioned that its lower reach is sufficiently submerged in the liquid 10 that it carries some of this liquid to its upper reach to serve in washing the eggs. It will be noted that the tabs 112 on the lower reach of the conveyor are so positioned that they rest on top of the egg which is resting on the upper reach of the scrubber belt. This positioning of the egg feeds it along the scrubber belt in a direction opposed to the travel of the scrubber belt and at a rate of speed sufficient to permit the proper cleaning of the egg before it is delivered to the stationary member 125, thence to the conveyor 126. This operation is continuous and the relative speeds of the parts may be so related as to obtain the desired cleaning of the various types of dirty eggs.

What I claim as new and desire to be secured by Letters Patent is:

1. In an egg washing machine, a tank adapted to contain an egg washing liquid, an endless scrubber belt horizontally disposed with its lower reach below the normal level of the egg washing liquid and its upper reach positioned above the liquid level, an endless conveyor belt positioned entirely above the upper reach of said scrubber belt and adapted to receive eggs on its upper reach and adapted to move said eggs to and along the upper reach of said endless scrubber belt, means for guiding and supporting said eggs as they move downwardly to said scrubber belt, and means to simultaneously move the adjacent reaches of said scrubber belt and conveyor belt in opposite directions and at different rates of speed.

2. In an egg washing machine, a tank adapted to contain an egg washing liquid, an endless scrubber belt horizontally disposed with its lower reach below the normal level of the washing liquid and with its upper reach disposed above said washing liquid, means to transversely curve the upper reach of said scrubber belt whereby it is made trough shaped, an endless conveyor belt adapted to move eggs through said trough shaped reach, and means operable to simultaneously move said scrubber belt and conveyor belt.

3. In an egg washing machine, a tank adapted to contain an egg washing liquid, an endless scrubber belt horizontally disposed with its lower reach below the normal level of the washing liquid and with its upper reach disposed above said washing liquid, means to transversely curve the upper reach of said scrubber belt whereby it is made trough shaped, a stationary table positioned above said scrubber belt, an endless conveyor belt encompassing said table and adapted to move eggs from said table and through said trough shaped reach, guide means for supporting said eggs as they are moved downwardly to said scrubber belt, and means operable to simultaneously move the adjacent reaches of said scrubber belt and conveyor belt in opposite directions.

4. In an egg washing machine, a tank adapted to contain a washing liquid, an endless scrubber belt horizontally positioned with its lower reach below the normal level of the washing liquid and its upper reach disposed thereabove, a stationary table positioned in spaced relation above said scrubber belt, an endless conveyor belt encompassing said table and operable to move eggs from said table onto and off the upper reach of said scrubber belt, guide means for supporting said eggs as they are moved downwardly to said scrubber belt, and power means to simultaneously drive said scrubber belt and conveyor belt.

5. In an egg washing machine, a tank adapted to contain a washing liquid, an endless scrubber belt horizontally positioned with its lower reach below the normal level of the washing liquid and its upper reach disposed thereabove, a stationary table positioned in spaced relation above said scrubber belt, an endless conveyor belt adapted to encompass said table and operable to move eggs from said table on to and off said scrubber belt, guide means for supporting said eggs as they are moved downwardly to said scrubber belt, and power means to simultaneously drive the adjacent reaches of said scrubber belt and conveyor belt at different rates of speed in opposite directions, said scrubber belt moving at a higher rate of speed than said conveyor belt.

6. In an egg washing machine, a tank adapted to contain a washing liquid, an endless scrubber belt horizontally positioned with its lower reach below the normal level of the washing liquid and its upper reach disposed thereabove, a stationary table positioned in spaced relation above said scrubber belt, an endless conveyor belt encompassing said stationary table and operable to segregate and to move eggs from said table on to and off said scrubber belt, guide means for supporting said eggs as they are moved downwardly to said scrubber belt, and power means to simultaneously drive said scrubber belt and conveyor belt.

7. In an egg washing machine, a tank adapted to contain a washing liquid, an endless scrubber belt horizontally positioned with its lower reach below the normal level of the washing liquid and its upper reach disposed thereabove, a stationary table positioned in spaced relation above said scrubber belt, an endless conveyor belt encompassing said table and having a plurality of compartments each adapted to receive a single egg and the belt being operable to move eggs from said table on to and off said scrubber belt, guide means for supporting said eggs as they are moved downwardly to said scrubber belt, and power means to simultaneously drive said scrubber belt and conveyor belt, said scrubber belt being driven at a higher rate of speed than said conveyor belt.

8. In an egg washing machine, a scrubber belt mounted and powered for orbital movement, a table mounted above said scrubber belt, a series of spaced apart parallel dividing strips stationary with and disposed above and length-wise of said table, an endless conveyor belt mounted for orbital movement about said table and in parallel relation with said scrubber belt, a plurality of series of cushion tabs carried by said conveyor belt to rest on said table and to receive a series of eggs thereon, each of said series of cushion tabs being disposed between adjacent dividing strips, said conveyor belt having propulsion means whereby said series of eggs are moved length-wise on the upper reach of said scrubber belt with the corresponding series of tabs resting on top of said series of eggs.

9. In an egg washing machine, a scrubber member comprising a series of like scrubber belts mounted and powered for orbital movement, a table mounted above said scrubber belts, a series of spaced apart parallel dividing strips stationary with and disposed above and length-wise of said table, an endless conveyor belt including spaced apart transverse strips mounted for orbital movement about said table and in parallel relation with said scrubber belts, a series of cushion tabs carried by each of said transverse strips to rest on said table and to receive a series of eggs thereon, each tab of said series of cushion tabs being disposed between adjacent dividing strips, said conveyor belt having propulsion means whereby said series of eggs are moved length-wise on the upper reach of said scrubber belt with the corresponding series of tabs resting on top of said series of eggs.

10. In an egg washing machine, a scrubber member comprising a series of like scrubber belts powered for orbital movement, means to make trough-shaped the upper reaches of said belts, a table mounted above said scrubber belts, a series of spaced apart parallel dividing strips stationary with and disposed above and length-wise of said table, an endless conveyor belt including spaced apart transverse strips mounted for orbital movement about said table and in substantially parallel relation with said scrubber belts, a series of cushion tabs carried by each of said transverse strips to rest on said table and to receive a series of eggs thereon, each tab of said series of cushion tabs being disposed between adjacent dividing strips, said conveyor belt having propulsion means whereby said series of eggs are moved length-wise on the trough-shaped upper reach of said scrubber belts with the corresponding series of tabs resting on top of said series of eggs.

11. In an egg washing machine, a scrubber member comprising a series of like scrubber belts mounted and powered for orbital movement, means to make trough-shaped the upper reaches of said belts, a table mounted above said scrubber belts, a series of spaced apart parallel dividing strips stationary with and disposed above and length-wise of said table, an endless conveyor belt including spaced apart transverse strips mounted for orbital movement about said table and in parallel relation with said scrubber belts, a series of cushion tabs carried by each of said transverse strips to rest on said table and to receive a series of eggs thereon, each tab of said series of cushion tabs being disposed between adjacent dividing strips, arcuate shield connecting said table with said upper reach of said scrubber belts, said conveyor belt having propulsion means whereby said series of eggs are moved length-wise on the trough-shaped upper reach of said scrubber belts with the corresponding series of tabs resting on top of said series of eggs.

12. In an egg washing machine, an endless scrubber belt disposed to travel in a substantially horizontal position, the lower reach of said belt being substantially planar, means to make the upper reach of said scrubber belt trough-shaped to receive a series of eggs to be washed, and means to move eggs in spaced apart relation along the trough-shaped portion of said scrubber belt at a speed differing from the speed of travel of the scrubber belt.

13. In an egg washing machine, an endless scrubber belt disposed to travel in a substantially horizontal position, the lower reach of said belt being substantially planar, a trough to form the upper reach of said scrubber belt trough-shaped to receive a series of eggs to be washed, and means to move eggs in spaced apart relation along the trough-shaped portion of said scrubber belt in a direction differing from the direction of travel of said scrubber belt.

14. In an egg washing machine, an endless scrubber belt mounted and powered for orbital movement with its upper and lower reaches disposed substantially horizontally, a stationary trough positioned to receive the upper reach of said scrubber belt whereby it is caused to be trough-shaped to receive eggs to be washed, and means to move eggs in spaced apart relation along said trough-shaped scrubber belt.

15. In an egg washing machine, an endless scrubber belt mounted and powered for orbital movement with its upper and lower reaches disposed substantially horizontally, a stationary trough positioned to receive the upper reach of said scrubber belt whereby it is caused to be curved transversely with its outer edges positioned above the normal horizontal plane of said upper reach and to receive eggs to be washed, and means to move eggs in spaced apart relation along said transversely curved scrubber belt.

16. In an egg washing machine, a tank adapted to contain an egg washing liquid, an endless scrubber belt horizontally disposed with its lower reach below the normal level of the egg washing liquid and its upper reach positioned above the liquid level, a table positioned above said scrubber belt, an endless conveyor belt adapted to move eggs from said table to and along the upper reach of said endless scrubber belt, guide means for supporting said eggs as they are moved downwardly to said scrubber belt, and means to simultaneously move said scrubber belt and conveyor belt at different rates of speed, said scrubber belt moving at a higher rate of speed than said conveyor belt.

GORDON W. JOHNSON.

REFERENCES CITED

The following references are of record in the file of this patent:

UNITED STATES PATENTS

| Number | Name | Date |
|---|---|---|
| 589,141 | Rice et al. | Aug. 31, 1897 |
| 755,937 | Richardson et al. | Mar. 29, 1904 |
| 1,095,942 | Stevens | May 5, 1914 |
| 1,439,702 | Haseltine | Nov. 10, 1921 |
| 1,502,424 | McCullough | Dec. 23, 1924 |
| 1,530,415 | Roussel | Mar. 17, 1925 |
| 1,776,784 | Cramer | Sept. 30, 1930 |
| 2,153,296 | Brogden | Apr. 4, 1939 |
| 2,292,143 | Meagher | Aug. 4, 1942 |
| 2,301,931 | Davis | Nov. 17, 1942 |

FOREIGN PATENTS

| Number | Country | Date |
|---|---|---|
| 23,349 | Australia | July 4, 1935 |